United States Patent [19]

Enda

[11] Patent Number: 4,660,055
[45] Date of Patent: Apr. 21, 1987

[54] PEN CONTROL CIRCUIT
[75] Inventor: Toyoaki Enda, Tokyo, Japan
[73] Assignee: Iwatsu Electric Co., Ltd., Tokyo, Japan
[21] Appl. No.: 847,069
[22] Filed: Apr. 1, 1986
[30] Foreign Application Priority Data Apr. 3, 1985 [JP] Japan .................................. 60-70467

[51] Int. Cl.$^4$ ............................................. G01D 15/24
[52] U.S. Cl. ................................. 346/139 R; 318/687
[58] Field of Search .............. 346/141, 140 R, 139 C, 346/139 R; 318/687, 626, 617; 33/18.1; 400/157.3; 101/93.03

[56]  References Cited
U.S. PATENT DOCUMENTS 3,864,695  2/1975  Nagashima .................... 346/139 R
4,527,108  7/1985  Enda ................................. 318/687
4,567,565  1/1986  Haselby ............................ 346/29 X

OTHER PUBLICATIONS

"An Intelligent Plotter for High-Throughput, Unattended Operation": by Martin L. Stone, et al., Apr. 1985 Hewlett-Packard Journal, p. 25.
"Low-Mass, Low-Cost Pen-Lift Mechanism for High--Speed Plotting" by Tammy V. Herr, Apr. 1985 Hewlett-Packard Journal, pp. 29, 30.

Primary Examiner—Joseph W. Hartary
Attorney, Agent, or Firm—Martin A. Farber

[57]  ABSTRACT

A pen control circuit includes a current control circuit for controlling the magnitude of a driving force of a drive coil, a feedback circuit for supplying a feedback signal to the current control ciruit, a clipper for extracting the pen position detection signal only when the level of the pen is higher than a predetermined level with respect to a recording surface, and a selector for selecting first, an output from the clipper as a drive current setting value of the current control circuit during an initial pen-down period and second, the pen pressure setting signal as the drive current setting value after the output from the clipper is disabled. The pen control circuit also includes a current setting circuit for supplying a predetermined drive current setting value to the current control circuit in a pen-up mode and a limiter for limiting a current supplied to the drive coil in accordance with a pen position detection signal when the pen is moved upward to a predetermined position.

11 Claims, 7 Drawing Figures

PEN CONTROL CIRCUIT

BACKGROUND OF THE INVENTION

The present invention relates to a control circuit for moving a pen up/down in a drawing apparatus such as an X-Y plotter or a drafting machine under the control of a current supplied to a drive coil.

In a conventional drawing apparatus such as an X-Y plotter, a pen is brought into contact with (pen-down) a surface of a recording sheet by moving a pen holder downward upon operation of a plunger-solenoid, and the pen is lifted (pen-up) by a biasing force of a return spring to the initial pen-up position. According to this system, a control operation is simple, however, an impact of the pen tip brought into contact with the recording surface is increased, and impact sound is also increased. In addition, it is difficult to obtain an optimal pen pressure in the pen-down mode. Furthermore, a residual magnetic field is often left in rotary and stationary iron cores of the plunger-solenoid, and the response speed of the pen is decreased over time. Another conventional X-Y plotter employs an impact damping means such as an air damper. However, the air damper decreases the response speed.

In order to solve those problems, a conventional pen control circuit shown in FIGS. 1 to 3 for electrically controlling a current supplied to a pen drive coil has been proposed (Japanese Patent Prepublication Nos. 59-2092207 and 58-182469) by the same applicant as that of the present invention. Referring to FIG. 1, a pen carriage housing 1 includes a sliding unit 1A reversibly slidable along a guide shaft 2 in the Y direction, and a pen holder unit 1B, reversibly movable in the Z direction (pen-up and pen-down directions) along a sliding shaft 3, for holding a pen 4. A drive coil 5, a speed detection coil 6, and a position detector (e.g., a Hall element) 7 are arranged in the pen holder unit 1B. A pair of permanent magnet plates 8A and 8B are mounted in the pen carriage housing 1 to oppose each other, as shown in a sectional view (FIG. 2) taken along the line A—A of FIG. 1. The drive coil 5, the speed detection coil 6 and the position detector 7 are arranged in a gap defined by the pair of permanent magnet plates 8A and 8B. The pen holder 1B is vertically moved along the pen-up/-down direction in accordance with a polarity of a current supplied to the drive coil 5, thereby controlling a driving force of the pen holder 1B. A voltage proportional to the speed of the pen-up or -down operation is detected by the speed detection coil 6. A change in magnetic field from the permanent magnets 8A and 8B along the Z direction is detected as a position signal by the position detector 7. Reference numeral 9 denotes a return spring for a pen-up operation; 1C, a stopper for determining a pen-up position; and 10, a recording sheet.

In the pen control circuit, as shown in FIG. 3, a sum signal from an adder 13 for adding detection signals from a current detector 12 and the speed detection coil 6 and an output from a phase compensator 14 are fed back to a current control circuit 11. A selector 16 selects either the position detection signal from the position detector 7 or a set value from a pen pressure setter 15 as a drive current setting value. When a control signal from a pen-up/-down signal generator 17 represents the pen-down mode, feed-back control is performed in response to the drive current setting value from the selector 16. However, when the control signal represents the pen-up mode, feed-back control is performed in response to a predetermined drive current setting value.

In the pen-down mode, the selector 16 selects a pen position signal VA from the position detector 7 until the pen comes close to the recording sheet from a pen-up position PA and reaches position PB, as shown in FIG. 4. The pen position signal VA serves as the drive current setting value. However, when the pen comes close to the recording sheet, i.e., passing the position PB, the selector 16 selects a pen pressure setting signal VB from the pen pressure setter 15. In this case, the pen pressure setting signal VB serves as the drive current setting value. The phase compensator 14 serves as a delay element. Upon operation of the phase compensator 14, the signal VA has a large magnitude during the initial drive period and has a relatively large drive current with a zero feedback component (phase delay), thereby improving the pen-down speed. When the pen tip comes near the position PB, the magnitude of the signal VA is decreased. At the same time, a damping effect of the speed detection signal is increased to decrease the impact of the pen tip at the time the pen is brought into contact with the surface of the recording sheet.

In the pen-up mode, the predetermined drive current setting value with a polarity opposite to that in the pen-down mode is supplied to the current control circuit 11 in accordance with the pen-up instruction from the pen-up/-down control signal generator 17. The pen is moved upward in response to the pen-up current cooperating with a biasing force from the return spring 9.

In the conventional pen control circuit described above, the pen pressure setting value VB is changed over a wide range to obtain an optimal pen pressure corresponding to a specific type of pen 4 (e.g., a fountain pen, a felt-tip pen, or a water ball-point pen). Assume that the setting value VB is set to be a low value VBL or a high value VBH, as indicated by the alternate long and short dashed line in FIG. 4. When constants and gains of the respective components of the control circuit are set to obtain a suitable response speed and a small impact for the setting value VB, the drive current setting value corresponding to the high value VBH is continuously supplied at a position where the pen tip does not come sufficiently close to the recording sheet. The braking effect following speed detection is then decreased to increase the impact. However, when the drive current setting value is the low value VBL corresponding to the position signal VA and the speed detection braking effect cause slow pen movement to a point where the pen comes excessively close to the recording sheet, thereby decreasing the response speed.

In addition to the problem presented by pen pressure presetting in accordance with the different types of pens, a conventional control circuit performs the pen-up operation by cooperation of a predetermined drive current and a biasing force of a return spring. Therefore, variations in return spring characteristics cause variations in the pen-up mode. Furthermore, even if the braking effect following speed detection is delayed and the gain of the position detection signal is increased so as to decrease the impact and increase the response speed in the pen-down mode, braking control in the pen-up mode cannot be performed. Furthermore, since a large current is often supplied to the pen-up position according to position control characteristics of the arrangement, the pen tip may have a high impact, a loud impact sound may be generated, and ink may drip from the pen tip.

SUMMARY OF THE INVENTION

It is, therefore, a principal object of the present invention to provide a pen control circuit wherein a pen pressure setting range is increased at a high response speed, and at the same time a pen-down impact can be decreased.

It is another object of the present invention to provide a pen control circuit wherein a pen-up impact can be decreased, and the response speed can be increased.

In order to achieve the above objects of the present invention, there is provided a pen control circuit comprising: a current control circuit for driving a pen upward or downward with respect to a recording surface in accordance with a polarity of a current supplied to a drive coil, and controlling a driving force in accordance with a magnitude of the current supplied to the drive coil; a feedback circuit, connected to a first input and an output of the current control circuit, for adding a pen speed detection signal and a current detection signal from the drive coil and supplying a feedback signal to the current control circuit; a clipper, an output of which is connected to a second input of the current control circuit and an input of which is connected to a pen position detection signal, for extracting the pen position detection signal only when a level of the pen is higher than a predetermined level with respect to the recording surface; and a selector, inputs of which are respectively connected to a pen pressure setting signal and the clipper and an output of which is connected to a third input of the current control circuit, for selecting first, an output from the clipper as a drive current setting value of the current control circuit during an initial pen-down period and second, the pen pressure setting signal as the drive current setting value after the output from the clipper is disabled.

There is also provided a pen control circuit comprising: a current control circuit for driving a pen upward or downward with respect to a recording surface in accordance with a polarity of a current supplied to a drive coil, and controlling a driving force in accordance with a magnitude of the current supplied to the drive coil; a feedback circuit, connected to a first input and an output of the current control circuit, for adding a pen speed detection signal and a current detection signal from the drive coil and supplying a feedback signal to the current control circuit; a current setting circuit for supplying a predetermined drive current setting value to the current control circuit in a pen-up mode; and a limiter for limiting a current supplied to the drive coil in accordance with a pen position detection signal when the pen is moved upward to a predetermined position.

DESCRIPTION OF THE PREFERRED EMBODIMENT

Figure 1:
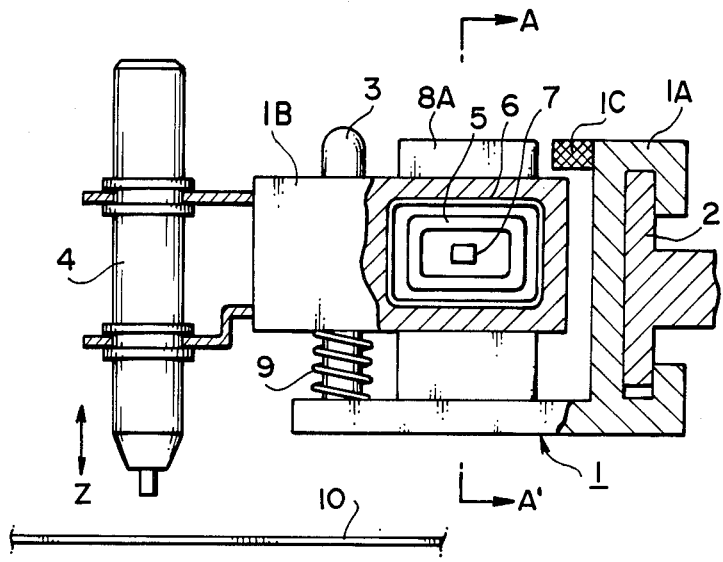
FIG. 1 is a side view showing part of a conventional pen carriage.
Figure 2:
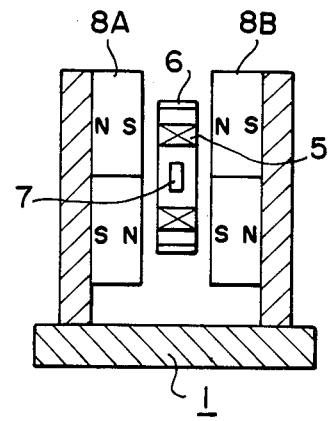
FIG. 2 is a sectional showing a main part of the pen carriage of FIG. 1 taken along the line A—A' thereof.
Figure 3:
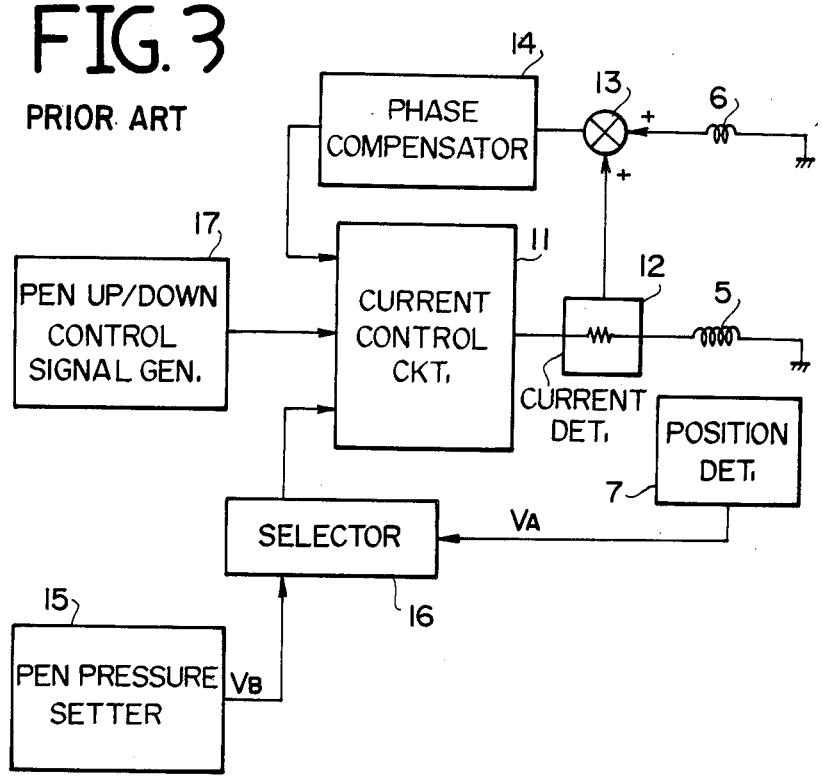
FIG. 3 is a block diagram of a conventional control circuit.
Figure 4:
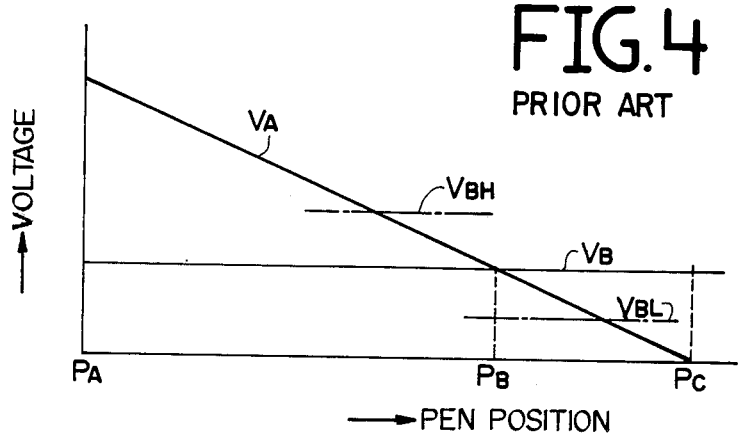
FIG. 4 is a graph for explaining selection of a drive current setting value in the conventional control circuit of FIG. 3.
Figure 5:
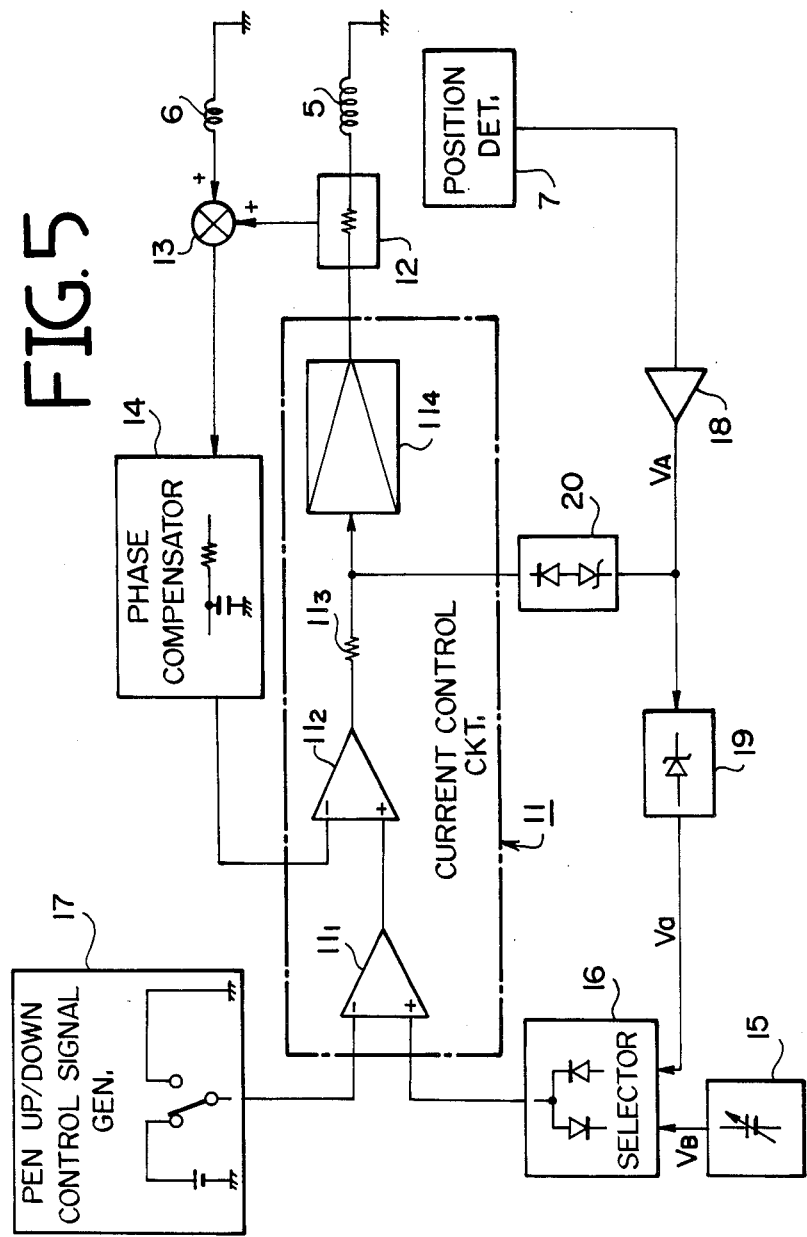
FIG. 5 is a circuit diagram of a control circuit according to an embodiment of the present invention.

FIG. 5 is a circuit diagram of a control circuit according to an embodiment of the present invention. The same reference numerals in FIG. 5 denote the same parts as in FIG. 3. An up/down control signal generator 17 generates a voltage of positive polarity in the pen-up mode and a reference voltage (i.e., a zero voltage) in the pen-down mode, thereby generating pen-up and -down commands. In a feedback circuit, an adder 13 adds a pen speed detection signal from a pen speed detection coil 6 and a current detection signal from a current detector 12 for detecting a current supplied to a drive coil 5. The feedback circuit feeds back the sum signal to a current control circuit 11 through a phase compensator 14. The detection signal from a position detector 7 is extracted as a position detection signal VA through a buffer amplifier 18. The position detection signal VA is supplied as one input Va of a selector 16 through a clipper 19. The clipper 19 extracts the position detection signal VA only when the position signal VA has a level exceeding a predetermined level, i.e., only when a pen 4 is set at a level higher than a predetermined level with respect to a recording surface 10. A Zener diode is used as the clipper 19. The selector 16 selects a signal with a higher level between a pen pressure setting signal VB from a pen pressure setter 15 and the output Va from the clipper 19. The signal of higher level is supplied as a pen-down drive current setting value to the current control circuit 11. The selector 16 is constituted by a combination of a Zener diode and a diode. The current control circuit 11 includes a differential amplifier $11_1$ for receiving the outputs from the up/down control signal generator 17 and the selector 16 and amplifying a difference therebetween, a current control amplifier $11_2$ for receiving the outputs from the differential amplifier $11_1$ and the phase compensator 14 and amplifying a difference therebetween, and a power amplifier $11_4$ for receiving and amplifying the output from the current control amplifier $11_2$ through a protective resistor $11_3$. An output from the power amplifier $11_4$ is supplied as an up-/down drive current to the drive coil 5. The differential amplifier $11_1$ serves as a drive current setting value switching circuit for the pen-up/-down mode. More specifically, since the output from the up/down control signal generator 17 serves as a reference voltage in the pen-down mode, the output from the selector 16 is amplified with a predetermined gain. However, in the pen-up mode, the output from the up/down control signal generator 17 serves as a voltage Vc of positive polarity. In this case, when the level of the voltage Vc is sufficiently higher than the output level of the selector 16, the output from the selector 16 is generated at a saturation level of the differential amplifier $11_1$ or a preset limiter value. The differential amplifier $11_1$ generates an output of positive polarity corresponding to the output from the selector 16 in the pen-down mode, and an output of negative polarity with a predetermined level in the pen-up mode. The current control amplifier $11_2$ receives the output of the differential amplifier $11_1$ as the drive current setting value and calculates a difference between this output and a feedback signal as the output from the phase compensator 14.

A limiter 20 is arranged between the input terminal of the power amplifier 11₄ and the output terminal of the buffer amplifier 18. When the output from the current control amplifier 11₂ has negative polarity (i.e., the pen-up mode), the limiter 20 limits the output in accordance with the level of the position detection signal VA, thereby limiting the current supply to the drive coil 5. The limiter 20 is constituted by a series circuit of a Zener diode and a forward-biased diode.

Figure 6:
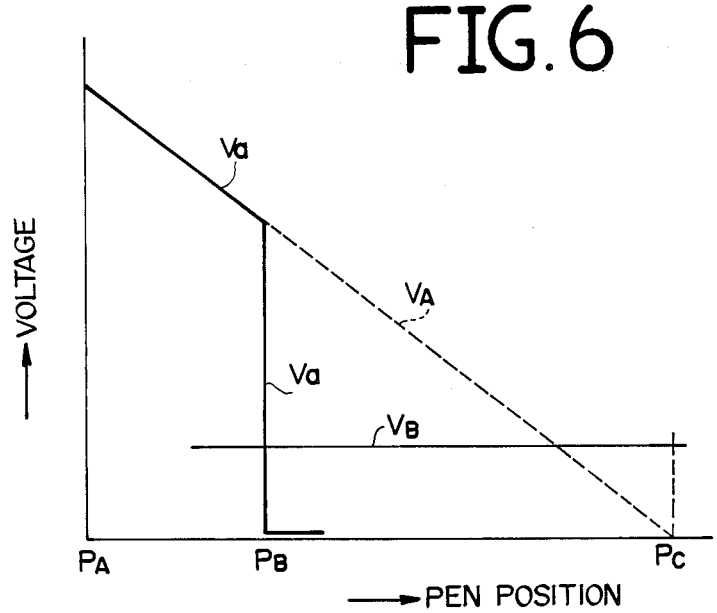
FIG. 6 is a graph for explaining selection of a drive current setting value in the circuit in FIG. 5.

The operation of the control circuit having the arrangement described above will be described with reference to FIGS. 6 and 7.

In the pen-up mode, when the up/down control signal generator 17 generates a pen-down command (the reference voltage), the differential amplifier 11₁ supplies the output (i.e., the drive current setting value) from the selector 16 to the current control amplifier 11₂. This current setting value is a value obtained such that the position detection signal VA from the position detector 7 is clipped by the clipper 19 and the voltage Va from the clipper 19 is amplified by the differential amplifier 11₁. Therefore, the current is supplied to the drive coil 5 so as to cause the pen to move downward toward the recording surface.

When the pen-down operation is started in response to the current supplied to the drive coil 5, the position detection signal VA is decreased. When the level of the signal VA is lowered to the clipping level of the clipper 19, the output voltage Va from the clipper 19 is set to be zero. The selector 16 then generates as the drive current setting value a setting value VB generated by the pen pressure setter 15.

The pen-down drive current setting value represents quick pen-down operation, with a large current, for a distance between a pen-up position PA and a position PB corresponding to the clipping level of the clipper 19. Thereafter, the pen pressure setting value VB, as a non-linear, stepwise setting value, serves as the pen-down drive current setting value for a distance between the position PB and a position PC where the pen tip is brought into contact with the recording surface, thus achieving feedback control. In this case, when the phase delay of the phase compensator 14 is set to substantially match the time required for moving the pen from the position PA to the position PB, the pen-down drive current is large since the current control circuit 11 provides a high gain due to its open loop. For the distance between the position PB and the position PC, the low level current represented by the pen pressure setting value VB is set. Subsequent braking action of the speed detection signal and feedback of the current detection signal then cause slow pen-down operation.

Figure 7:
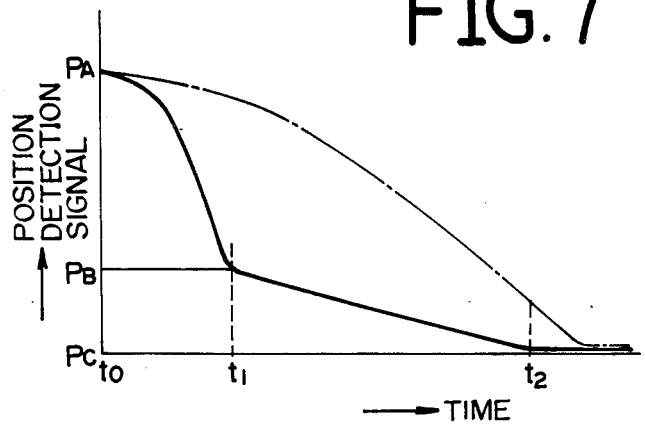
FIG. 7 is a graph showing the characteristics in the pen-down mode.

The pen-down characteristic curve for the distance between the position PA and the position PB is steep for a short time interval from time t0 to time t1, as seen in FIG. 7. However, the pen-down characteristic curve for the distance between the position PB and the position PC is moderate for a relatively long time interval from time t1 to time t2. The pen-down characteristic curve indicated by the alternate long and short dashed line in FIG. 7 represents pen-down characteristics of a conventional control circuit. As is apparent from a comparison between the pen-down characteristic curve of this embodiment and the conventional pen-down characteristic curve, the response time of the pen-down operation can be shortened and the pen tip can be gently brought into contact with the recording surface 10, thereby decreasing the pen tip impact with the pen control circuit of this embodiment. When the pen pressure setting circuit is changed in accordance with the type of pen, the time interval between time t1 and time t2 corresponding to the braking time can be guaranteed to be relatively long. As a result, neither the pen tip impact nor the response time are increased.

In the pen-down mode, when the pen-up/-down control signal generator 17 generates a pen-up command (i.e., the voltage VC), the differential amplifier 11₁ generates a current of negative polarity with the predetermined level as the drive current setting value. The current of the drive coil 5 is controlled in accordance with the setting value. In the initial pen-up operation, the magnitude of the position detection signal VA is substantially zero and the magnitude of the feedback signal is also substantially zero due to the delaying action of the phase compensator 14. Therefore, the pen is quickly lifted with a large current. Along with the lifting of the pen, the level of the pen position detection signal VA is increased, and then the speed detection signal and the current detection signal effect braking. More specifically, when a difference between the signal VA and the output from the current control amplifier 11₂ exceeds the limiter value of the limiter 20 due to an increase in the position detection signal VA, the output from the current control circuit 11₂ is gradually limited. This limited value is decreased due to the increase in signal VA when the pen comes close to the position PA, thereby gradually decreasing the drive current. Therefore, during the initial period of the pen-up mode, high response speed can be guaranteed by the large drive current without depending on a biasing force of a return spring. When the pen comes close to the pen-up position PA, the driving force is limited by the position detection signal in addition to conventional braking by the speed detection signal. The impact of the pen against a stopper IC or the like can be decreased.

According to the present invention as described above, in pen-down current setting for the drive coil in response to the pen position signal, a large current is supplied to the drive coil for a distance between the pen-up position and the position corresponding to the clipping level. The drive current is then switched to a low level current with a nonlinear, stepwise function, thereby increasing the pen-down gain in response to the position signal to improve the response speed. In addition, the braking region defined by the pen pressure setting signal and the speed signal is increased. In this manner, the impact force between the pen and the recording surface, and a sound caused thereby, can be decreased while the pen pressure setting range is increased.

According to the present invention, since a limiter is arranged to limit the drive coil current in response to a pen-up position signal, the pen-up drive current setting value and hence the response speed are increased, while at the same time the impact force between the pen and a stopper, and a sound caused thereby, can also be decreased.

What is claimed is:
1. A pen control circuit comprising:
a current control circuit for driving a pen upward or downward with respect to a recording surface in accordance with a polarity of a current supplied to a drive coil, and controlling a driving force in accordance with a magnitude of the current supplied to said drive coil;

a feedback circuit, connected to a first input and an output of said current control circuit, for adding a pen speed detection signal and a current detection signal from said drive coil and supplying a feedback signal to said current control circuit;

a clipper, an output of which is connected to a second input of said current control circuit and an input of which is connected to a pen position detection signal, for extracting the pen position detection signal only when a level of the pen is higher than a predetermined level with respect to the recording surface; and a selector, inputs of which are respectively connected to a pen pressure setting signal and said clipper and an output of which is connected to a third input of said current control circuit, for selecting first, an output from said clipper as a drive current setting value of said current control circuit during an initial pen-down period and second, the pen pressure setting signal as the drive current setting value after the output from said clipper is disabled.

2. A circuit according to claim 1, wherein said current control circuit comprises:

a differential amplifier for calculating and amplifying a difference between an up/down control signal and an output from said selector;

a current control amplifier for calculating and amplifying a difference between an output from said differential amplifier and the feedback signal from said feedback circuit; and a power amplifier for amplifying an output from said current control amplifier through a protective resistor.

3. A circuit according to claim 2, wherein said feedback circuit comprises:

an adder for adding a pen speed detection signal and an output from said power amplifier; and a phase compensator, an input of which is connected to an output of said adder and an output of which is connected to an inverting input terminal of said current control amplifier, for supplying the feedback signal thereto.

4. A circuit according to claim 3, wherein said phase compensator comprises a resistor, one end of which is connected to said output of said adder and the other end of said first inverting input terminal of said current control amplifier; and a capacitor, one end of which is connected to the other end of said resistor and the other end of which is grounded.

5. A circuit according to claim 4, wherein said clipper comprises a Zener diode, a cathode of which receives the pen position detection signal and an anode of which is connected to said selector.

6. A circuit according to claim 5, wherein said selector comprises a pair of diodes, anodes of which are respectively connected to the pen pressure setting signal and the output of said clipper, and cathodes of which are commonly connected to a noninverting input terminal of said differential amplifier.

7. A pen control circuit comprising:

a current control circuit for driving a pen upward or downward with respect to a recording surface in accordance with a polarity of a current supplied to a drive coil, and controlling a driving force in accordance with a magnitude of the current supplied to said drive coil;

a feedback circuit, connected to a first input and an output of said current control circuit, for adding a pen speed detection signal and a current detection signal from said drive coil and supplying a feedback signal to said current control circuit;

a current setting circuit for supplying a predetermined drive current setting value to said current control circuit in a pen-up mode; and a limiter for limiting a current supplied to said drive coil in accordance with a pen position detection signal when the pen is moved upward to a predetermined position.

8. A circuit according to claim 7, wherein said current control circuit comprises:

a differential amplifier for calculating and amplifying a difference between an up/down control signal and an output from a selector;

a current control amplifier for calculating and amplifying a difference between an output from said differential amplifier and the feedback signal from said feedback circuit; and a power amplifier for amplifying an output from said current control amplifier through a protective resistor.

9. A circuit according to claim 8, wherein said feedback circuit comprises:

an adder for adding a pen speed detection signal and an output from said power amplifier; and a phase compensator, an input of which is connected to an output of said adder and an output of which is connected to an inverting input terminal of said current control amplifier, for supplying the feedback signal thereto.

10. A circuit according to claim 9, wherein said current setting circuit comprises:

a power source, a negative terminal of which is grounded; and a switch, a first movable contact of which is connected to a positive terminal of said power source, a second movable contact of which is grounded, and a stationary contact of which is connected to an inverting input terminal of said differential amplifier in said current control circuit.

11. A circuit according to claim 10, wherein said limiter comprises:

a diode, a cathode of which is connected to an input terminal of said power amplifier; and a Zener diode, an anode of which is connected to an anode of said diode and a cathode of which is connected to the pen position detection signal.

* * * * *